Patented Nov. 10, 1942

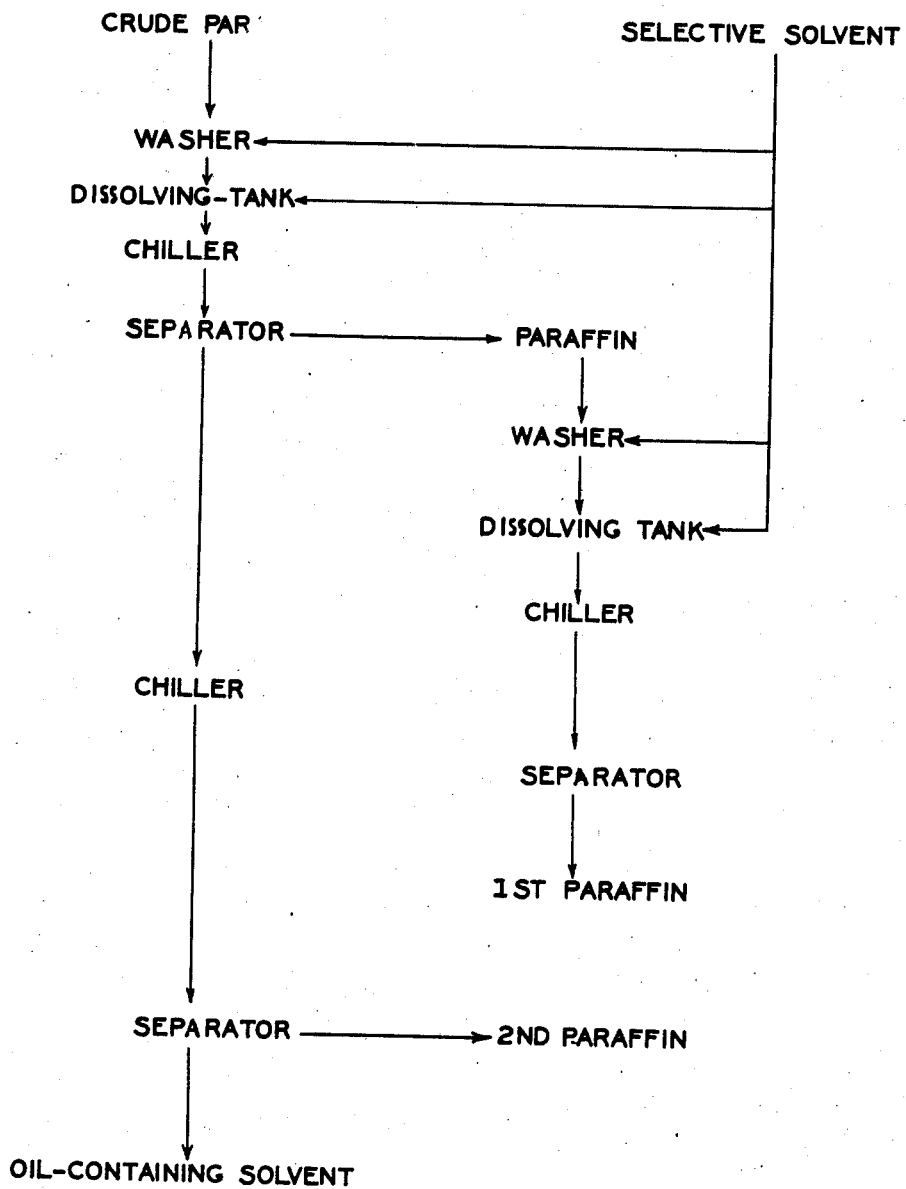

2,301,801

UNITED STATES PATENT OFFICE 2,301,801

REFINING WAX

Robert E. Burk and Everett C. Hughes, Cleveland, Ohio, assignors to The Standard Oil Company, Cleveland, Ohio, a corporation of Ohio Application October 13, 1937, Serial No. 168,750

2 Claims. (Cl. 196—20)

Paraffin as initially obtained from mineral oils is contaminated by impurities and a considerable content of the oil, and includes a mixture of waxes having different melting points. It is an old practice to wash the wax collected in a cake in a filter press, by the application of cold washing and purifying liquids, but as applied in this way there is serious channeling, the results are very inefficient, and besides there is a tie-up of press equipment which is unduly prolonged. It is a customary practice further, that the final cake is subjected to a sweating operation, the temperature of treatment being such as to allow the remaining oil and low melting wax constituents to ooze out and leave the more solid crystalline constituents. The total result is that while the wax is fairly well freed of contaminations and oil, the procedure is tedious and the obtained wax is not of as high melting point as might be desired. In accordance with the present invention however, the wax may be refined with important saving of time, and it may further be fractionated such as to attain the highest melting point constituent in close-cut condition, and other lower-melting constituents as desired.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The crude wax obtained by separation from its oil source, as for illustration by precipitation with the use of solvents and collected as a filter cake in the press may be fractionated directly in accordance with the invention, or the original waxy oil and solvent may be filter-pressed stage-wise using successively lower temperatures and separating wax of successively lower melting points, or the oil in the wax may be removed before fractionation of the wax; thus the cake may be disseminated in comminuted form in a solvent for oil but not for the wax at a temperature below the melting point of the wax, and after suitable exposure in the solvent, the wax may again be separated by filtering. Then dissemination with more solvent and a re-washing may be carried out in repetition further if desired. And, of course, instead of the filtration, other ways of obtaining the separation as cold settling, centrifuging, etc., may be employed; in every case the wax in disseminated condition being subjected to the washing action of the solvent below the temperature of substantial wax solution, illustrative operating temperatures being for instance —10 to +30° F. This not only provides particularly effective action upon the crude wax for the removing of the oil and impurities, but also makes possible the very advantageous operation of refining directly in connection with a solvent process where that is used for obtaining the wax in the first instance, or for extracting and dewaxing the oil. In any of the procedures it is desirable to wash each cut or fraction of wax with an additional portion of solvent, for instance by removing the cake from the press, stirring it up and re-filtering, and in particular it is preferable to wash the wax at least twice, removing it from the press each time. The amount of solvent desirably employed in refining wax, being up to forty volumes per volume of wax, and since this can be directly turned to use as a diluent for the oil coming into the first stage of the dewaxing or dewaxing and extracting system, substantially nothing additional is required for an existent plant, and it becomes merely a matter of cycling in the respective stages. The efficiency in washing in this manner is very high. Thus, for example assuming an oil containing in the first instance 10 per cent of wax and this being mixed with 3 volumes of solvent in the first stage for the initial dewaxing, then if the collected wax which the present operation takes out contains 50 per cent of residual wax, and this wax is disseminated into three parts of solvent based on the original oil, and is collected and washed again, and the so obtained cake or collected wax has 50 per cent of the new solution in it, on separating the solvent from the wax a mere 0.078 per cent of the original oil is retained and the wax now contains 0.7 per cent oil. A repetition of the washing of the collected wax would reduce the amount of oil to substantially nothing. The solvents employed are such as to have complete solubility for the oil at low temperatures but very little solubility for the wax, and the physical characteristics, viscosity, etc. of the solvent should be such as to facilitate throughout an ultimate separation. Thus, liquid sulphur dioxide with benzol or ethyl ether or isopropyl ether is especially advantageous. In some cases methyl ethyl ketone or acetone may be used instead of the sulphur dioxide. In general, the sulphur dioxide or the like should run around 15 to 35 per cent in the mixture, the benzol or the like making up the remaining per cent.

In fractionating the wax, it is next dissolved in a solvent, which may be a mixture as noted, the dissolving being accomplished by raising the temperature sufficiently. This solution is now partially cooled, and the high melting point wax separates as a slurry and can be removed. On still further cooling the solvent with its remaining wax the intermediate wax separates in slurry condition and can be removed. In accordance with the particular wax and the number of fractions or portions which it is desired to separate, the fractional cooling and separating of the wax can be applied in quite fine detail. Residual solvent is next removed from the various wax fractions which have been obtained, and the resultant waxes are highly pure, being notably free from oil and contaminations, and with melting points adjusted close as desired.

The accompanying drawing illustrates diagrammatically the various steps of the process.

The wax, particularly that of higher melting point, is further very greatly improved in its formation of texture by incorporating, after the separation of the oil, a small amount of a crystal-modifying agent of material such as retene, naphthalene, phenanthrene, high molecular weight polymers of isobutylene, diphenyl, triphenyl or cresyl phosphates, aluminum stearate, methyl abietate, etc., the amount of such treating agent being in general a few per cent, as one-half to ten, depending upon the extent of effect desired.

As an example: Slack wax was obtained from a wax slop by filtering with benzol and sulphur dioxide, the benzol being in predominant amount, and the wax was dissolved in 3 volumes of a mixture of 65 per cent benzol and 35 per cent acetone and was filtered at 80° F. A 25 per cent yield of a clear white wax of melting point 153 was recovered which had an oil content of only 0.5 per cent.

As another example: Crude slack wax from paraffin distillate was dissolved in 3 volumes of a mixture of 25 per cent liquid sulphur dioxide, 57.75 per cent benzol and 17.25 per cent toluene, and was chilled to —5° F., and the wax filtered off. Sixty-six per cent of wax having a melting point of 115.5° F. was recovered, and 34 per cent of oil. The wax was dissolved in 3 volumes of a mixture of 25 per cent liquid sulphur dioxide and 75 per cent benzol and was cooled to 70° F. The wax slurry formed was filtered off under pressure, and 24 per cent of white wax was recovered having a melting point 128.1° F. By washing the wax cut at 70° F. with a new portion of the same solvent, the melting point may be raised higher.

Other modes of applying the principle of the invention may be employed, change being made as regards the details described, provided the features stated in any of the following claims, or the equivalent of such, be employed.

We therefore particularly point out and distinctly claim as our invention:

1. The process of refining paraffin, which comprises comminuting and washing crude paraffin in an oil solvent mixture of sulphur dioxide with 65% to 85% of benzol or benzol and toluene at a temperature below the melting point of the paraffin to remove substantially all of the oil therefrom, separating the oil denuded paraffin from the solvent, dissolving the separated paraffin in a similar solvent at a temperature above the melting point of the paraffin, and fractionally precipitating and separating selective fractions of wax from the solution by cooling.

2. A process of refining paraffin, which comprises comminuting and washing crude paraffin in at least an equal volume of an oil solvent mixture involving liquid sulphur dioxide with 65–85 per cent of benzol or benzol and toluene at a temperature below melting of the paraffin to substantially remove the oil, then dissolving the paraffin in a similar solvent mixture at a higher temperature, lowering the temperature, separating the solvent and the paraffin, washing the paraffin in solvent, then dissolving the paraffin in a solvent at a raised temperature, chilling, and separating the purified paraffin.

ROBERT E. BURK.
EVERETT C. HUGHES.